(12) United States Patent
Mills et al.

(10) Patent No.: US 11,157,270 B2
(45) Date of Patent: Oct. 26, 2021

(54) MULTI-PLATFORM PATTERN-BASED USER INTERFACES

(71) Applicant: Oracle International Corporation, Redwood Shores, CA (US)

(72) Inventors: Duncan Richard Mills, Winchester (GB); Kenichi Mizuta, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/448,580

(22) Filed: Jun. 21, 2019

(65) Prior Publication Data

US 2019/0310844 A1 Oct. 10, 2019

Related U.S. Application Data

(63) Continuation of application No. 15/497,701, filed on Apr. 26, 2017, now Pat. No. 10,372,443.

(Continued)

(51) Int. Cl.
*G06F 8/76* (2018.01)
*G06F 8/73* (2018.01)
(Continued)

(52) U.S. Cl.
CPC .............. *G06F 8/73* (2013.01); *G06F 8/20* (2013.01); *G06F 8/316* (2013.01); *G06F 8/35* (2013.01); *G06F 8/38* (2013.01); *G06F 8/76* (2013.01); *G06F 9/44542* (2013.01); *H04L 67/10* (2013.01)

(58) Field of Classification Search
CPC combination set(s) only.
See application file for complete search history.

(56) References Cited

U.S. PATENT DOCUMENTS 7,278,130 B2 10/2007 Iborra et al.
8,595,103 B1 11/2013 Wargin et al.
(Continued)

OTHER PUBLICATIONS

U.S. Appl. No. 15/497,701, "Non-Final Office Action", dated Feb. 20, 2019, 12 pages.
(Continued)

*Primary Examiner* — Hien L Duong
(74) *Attorney, Agent, or Firm* — Kilpatrick Townsend & Stockton LLP

(57) ABSTRACT

Techniques are provided for encapsulating a user experience design for user interfaces of an application, where the user experience design comprises a look and feel of the application and a plurality of functional elements of the application. A plurality of rules for implementing the one or more user interfaces may be defined, and the rules may be based at least in part on the user experience design. Additionally, a pattern may be generated based at least in part on the plurality of rules. The pattern may be deployed to a distributed network of computing devices, and reused in the design of multiple other applications. The new user interfaces for those applications may be generated based at least in part on the pattern, where the additional applications comply with the look and feel and the plurality of functional elements of the other applications that share the pattern.

20 Claims, 12 Drawing Sheets

Related U.S. Application Data

(60) Provisional application No. 62/409,828, filed on Oct. 18, 2016.

(51) Int. Cl.
*H04L 29/08* (2006.01)
*G06F 8/38* (2018.01)
*G06F 8/20* (2018.01)
*G06F 8/30* (2018.01)
*G06F 8/35* (2018.01)
*G06F 9/445* (2018.01)

(56) References Cited

U.S. PATENT DOCUMENTS

| | | | |
|---|---|---|---|
| 8,788,295 | B1 | 7/2014 | Wargin et al. |
| 9,329,839 | B2* | 5/2016 | Delaney, Jr. ............... G06F 8/34 |
| 2004/0027378 | A1 | 2/2004 | Hays et al. |
| 2004/0148586 | A1* | 7/2004 | Gilboa ...................... G06F 8/38 |
| | | | 717/108 |
| 2005/0198616 | A1* | 9/2005 | Uehara ..................... G06F 8/20 |
| | | | 717/108 |
| 2006/0004845 | A1 | 1/2006 | Kristiansen et al. |
| 2007/0043992 | A1* | 2/2007 | Stevenson ................ G06F 8/20 |
| | | | 714/732 |
| 2007/0288853 | A1 | 12/2007 | Neil |
| 2008/0045172 | A1 | 2/2008 | Narayanaswami et al. |
| 2008/0163080 | A1 | 7/2008 | Kooy et al. |
| 2008/0263509 | A1* | 10/2008 | Brutman ................... G06F 8/20 |
| | | | 717/104 |
| 2008/0263536 | A1 | 10/2008 | Duggan et al. |
| 2008/0313282 | A1 | 12/2008 | Warila et al. |
| 2010/0175044 | A1 | 7/2010 | Doddavula et al. |
| 2011/0154287 | A1 | 6/2011 | Mukkamala et al. |
| 2011/0258595 | A1 | 10/2011 | Clevenger |
| 2011/0302516 | A1 | 12/2011 | White et al. |
| 2012/0066620 | A1 | 3/2012 | Teng et al. |
| 2013/0132854 | A1 | 5/2013 | Raleigh et al. |
| 2013/0205277 | A1 | 8/2013 | Seven et al. |
| 2014/0075347 | A1* | 3/2014 | Banerjee ................... G06F 8/38 |
| | | | 715/763 |
| 2014/0372518 | A1 | 12/2014 | Moore et al. |
| 2015/0040104 | A1 | 2/2015 | Mall et al. |
| 2015/0142949 | A1 | 5/2015 | Nair |
| 2016/0070457 | A1* | 3/2016 | Furtwangler ....... G06F 3/04847 |
| | | | 715/763 |
| 2016/0092339 | A1 | 3/2016 | Straub et al. |
| 2016/0335067 | A1 | 11/2016 | Narayanan |
| 2016/0378439 | A1 | 12/2016 | Straub et al. |
| 2017/0102927 | A1 | 4/2017 | Gunther, Jr. et al. |
| 2017/0123777 | A1 | 5/2017 | Mittal et al. |
| 2017/0131978 | A1 | 5/2017 | Iyer et al. |
| 2017/0322716 | A1 | 11/2017 | Khoyi et al. |
| 2017/0329468 | A1 | 11/2017 | Schon et al. |
| 2018/0107343 | A1 | 4/2018 | Mills et al. |

OTHER PUBLICATIONS

U.S. Appl. No. 15/497,701, "Notice of Allowance", dated Jun. 3, 2019, 6 pages.

* cited by examiner

MULTI-PLATFORM PATTERN-BASED USER INTERFACES

CROSS REFERENCE TO RELATED APPLICATIONS

The present application is a continuation of, and claims the benefit and priority of U.S. application Ser. No. 15/497,701, filed Apr. 26, 2017, entitled "MULTI-PLATFORM PATTERN-BASED USER INTERFACES", which claims the benefit and priority under 35 U.S.C. 119(e) of U.S. Provisional Application No. 62/409,828, filed Oct. 18, 2016, entitled "MULTI-PLATFORM PATTERN-BASED USER INTERFACES," the entire contents of which are incorporated herein by reference for all purposes.

BACKGROUND

In many cases, user interface development involves applying logical user experience design patterns to represent a set of data or a business function in a standard and predictable way. Today, development teams use a combination of techniques to achieve this goal namely: pattern documentation which instructs the developers on how UIs should look and interact, standardized templates and components which implement the pattern, standardized style sheets or similar which define colors fonts and other visual artifacts, and standardized sets of reusable resources (strings/icons etc.). However, combining this set of resources is both a manual task, and generally error prone, particularly in the case of the interpretation of documentation based guidelines. Additionally, adhering to pattern standards can be challenging and creating multiple physical realizations of that pattern across multiple platforms and form factors can also be quite difficult given current tools.

BRIEF SUMMARY

Techniques are provided (e.g., a method, a system, non-transitory computer-readable medium storing code or instructions executable by one or more processors) for providing multi-platform pattern-based user interfaces. In some examples, a method may be disclosed that is configured to determine a user experience design for one or more user interfaces of a first application, where the user experience design comprises a look and feel of the first application and a plurality of functional elements of the first application. The method may also be configured for defining a plurality of rules for implementing the one or more user interfaces based at least in part on the user experience design and generating a pattern based at least in part on the plurality of rules. Additionally, the method may be configured for deploying the pattern to a distributed network of computing devices, receiving a request to design a second application, and generating a new user interface for the second application based at least in part on the pattern, where the second application complies with the look and feel of the first application and the plurality of functional elements associated with the first application.

In certain embodiments, the plurality of functional elements may comprise user actions that can be performed via the user interface of the application. The user actions may comprise at least one of finding a record, duplicating a record, drilling down into a record, or rotating a device configured to display the user interface of the application. Further, the pattern may be configured as a carrier component that is embedded into the one or more user interfaces or the new user interface during a design phase. The method may also be configured to replace the carrier component with the pattern at runtime, and the carrier component may be defined in a pattern usage document. Additionally, the method may be configured for enabling event handlers for the pattern to be defined by a consuming application. Further, in some examples, the method may be configured for generating a cached version of the pattern based at least in part on a pattern usage document that defines the pattern. The method may also be configured for receiving a request to update the pattern, providing the pattern usage document, receiving a revised pattern usage document, and/or redeploying the application based at least in part on the revised pattern usage document. In some embodiments, the pattern usage document may be provided within a customization sandbox to allow changes to be prototyped before final publication.

In certain embodiments, a system may be disclosed, where the system comprises a memory configured to store computer-executable instructions and a processor configured to access the memory and execute the computer-executable instructions. The computer-executable instructions may configure the system to determine a user experience design for one or more user interfaces of a first application, the user experience design comprising a look and feel of the first application and a plurality of functional elements of the first application, define a plurality of rules for implementing the one or more user interfaces based at least in part on the user experience design, generate a pattern based at least in part on the plurality of rules, deploy the pattern to a distributed network of computing devices, receive a request to design a second application, and generate a new user interface for the second application based at least in part on the pattern, where the second application complies with the look and feel of the first application and the plurality of functional elements associated with the first application.

In certain embodiments, the plurality of functional elements may comprise user actions that can be performed via the user interface of the application. In some examples, the user actions may comprise at least one of finding a record, duplicating a record, drilling down into a record, or rotating a device configured to display the user interface of the application. Additionally, the pattern may be configured as a carrier component that is embedded into the one or more user interfaces or the new user interface during a design phase. Further, the carrier component may be defined in a pattern usage document.

In certain embodiments, a computer-readable medium (e.g., that may be non-transitory) may be disclosed that is configured to instruct a processor to determine a user experience design for one or more user interfaces of a first application, where the user experience design comprises a look and feel of the first application and a plurality of functional elements of the first application. The computer-readable medium may also be configured to instruct the processor for defining a plurality of rules for implementing the one or more user interfaces based at least in part on the user experience design and generating a pattern based at least in part on the plurality of rules. Additionally, the computer-readable medium may also be configured to instruct the processor for deploying the pattern to a distributed network of computing devices, receiving a request to design a second application, and generating a new user interface for the second application based at least in part on the pattern, where the second application complies with the look and feel of the first application and the plurality of functional elements associated with the first application.

In certain embodiments, the operations further comprise deploying the application and/or generating a cached version of the pattern based at least in part on a pattern usage document that defines the pattern. Further, in some examples, the operations may also include receiving a request to update the pattern, providing the pattern usage document in a sandbox, receiving, within the sandbox, a revised pattern usage document, and/or redeploying the application based at least in part on the revised pattern usage document.

DETAILED DESCRIPTION

Figure 1:
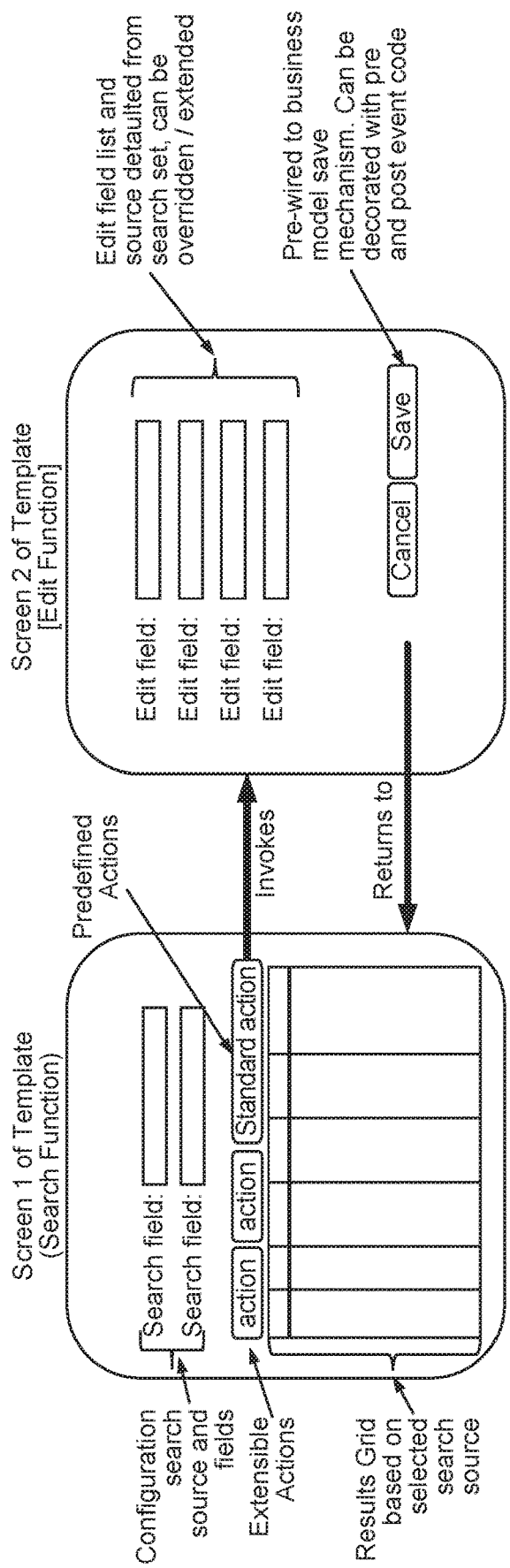
FIG. 1 is a simplified block diagram illustrating components of a multi-platform pattern-based user interface, in accordance with an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, producing multi-platform, pattern-based user interfaces (UIs). For example, user interfaces may be generated within a cloud and/or on premise business software. In some examples, the UIs may be generated through a core piece of software (e.g., as opposed to data-bases or middleware) for performing business functions (e.g., customer service management, financials, human resources, etc.). In some cases, this core software may be known as Fusion by Oracle Corp. Customers may be business owners, sales people, HR, etc. for medium to large businesses. As such, it may be a very wide range of software options. In some examples, all of the business software may be based on a common stack. For example, under the covers, it may all be based on one or more cloud infrastructures and/or run on premise (e.g., on customer site). A common cloud infrastructure may be used that may be a Java application server-based infrastructure using a middleware product (e.g., Oracle's Fusion) and one or more databases. As such, the core components of a cloud service may be utilized to implement the business software and/or to generate the UIs.

In some examples, the applications may be run on the cloud infrastructure, but are generally built using an Application Development Framework (ADF) tool. The ADF tool is a productivity framework on top of core Java enterprise and JavaScript Application Programming Interfaces (APIs). This provides most development teams a very declarative way of building their applications. The basic concept of "less code is good" is embodied and the system is based on configuring the runtime framework more than writing code. For example, the process of generating screens for users and linking screens together is declaratively controlled, instead of code-based. The ADF can be used to develop bespoke business software applications and/or to extend current business software applications.

When building user interfaces, developers want user interfaces to appear consistent both within and across applications. For example, in a representation of tabular data, we would expect all instances of tables across an application to look broadly similar (accepting that they will contain different data sets), i.e. row heights and fonts are consistent, each table has the same toolbar buttons with the same icons, user interaction with the table is identical and predictable and so on.

Given our experiences of trying to enforce pattern consistency across user interfaces in Fusion Applications we have engineered a complete holistic solution to the problem of consistent UI development that removes the variability across UI instances whilst at the same time maintains the flexibility required for each individual UI instance. This provides a much more flexible approach than conventional template based development, although it does provide the same root benefits of define once, reuse many times, and update over time. Some of the key features of the system are detailed below.

A single pattern definition can be used to define user interfaces for multiple platforms (e.g. Java EE, JavaScript and Mobile) and form factors within those platforms (e.g. desktop, tablet, mobile phone, etc.).

In some examples, the service provider can be agnostic to the underlying technology. Most will be using this within the context of a convention Java web application. But, everything the developer does with relation to the pattern is inherently in a portable format so as time goes on, the pattern usage can be lifted up and dropped onto a different infrastructure (e.g., a JavaScript-based engine or a mobile-based engine). It becomes a portable definition of the UI. The portability extends beyond the simple definition of the UI into more complex areas such as event handling and navigation, so the programming model that the developer uses is done in a generic, agnostic way. Therefore, such code that the developer has to write does not need to concern itself about whether an event is coming from a JavaScript native event or from an HTTP request via a web server. In some examples, there may be a core engine with pluggable pattern implementations. Thus, a pattern can be decomposed into a hierarchy of sub-elements which configure specific aspects of the pattern look and behavior. For example, a "form" pattern may have a title, fields with labels, a standardized toolbar with buttons, etc. Each of these pieces can be represented as a configuration element within the hierarchy, providing a combination of a UI definition and a behavioral definition. The realization of the pattern is configured by this element hierarchy and surfaced to the UI using the appropriate technology implementation. For example, if being run on a web based application in a Java EE environment, the pattern may be surfaced through the adapters that exist within the ADF framework; however, if it were in a JavaScript environment, for example a web-browser it would use JavaScript components to do the same thing.

Every touch point with the environment is designed to be pluggable. Even functions such as how error messages are delivered from the infrastructure to users, it may be done in completely different ways based on the type of physical infrastructure the application is being run on (e.g., a web server based UI, a mobile UI on a native mobile device, or a JavaScript UI in a browser. All of these touch points are abstracted within the framework of the service, which enables the portability of the applications and/or the patterns.

In some examples, the portability enables the system to take a desktop web-based page and move it to a native mobile application without the developer having to change the page at all. Instead, the pattern will take care of the moving around and changing of the UI that is required to move to the new platform and form factor. In particular, when it comes to multiple form factors, it isn't enough to just render in a different technology. Often, it may be necessary to re-prioritize the UI as well. For example, if a table of data is initially being displayed with some number of columns (e.g., fifteen), that may work on a desktop web browser. However, that may not display properly on the more restricted screen of a mobile phone. Thus, the service described herein is configured to re-prioritize and re-shuffle the UI elements based at least in part on the delivery device. To do this, the developer that configures the pattern, can provide various hints as to how important a particular column in that table is using a standardized ranking mechanism. When the UI is delivered to a user, the system will shuffle the UI so that the most appropriate column is rendered. In some examples, the table may be shrunk so the user only sees one or two columns, or may not display a table at all, or even change the number of columns based on device orientation. In order to handle multiple platforms and form factors, the pattern may indicate (e.g., via documentation) it (the pattern) has the right to reorganize the screen that the developer is defining. The documentation may also indicate particular behaviors that may be exhibited. With this information, the developer may be enabled to indicate which features are most important. As the pattern implementation changes, the changes will happen at the consuming application without interaction or intervention of the developer. One benefit to this system, is that changes to the pattern implementation can be automatically propagated to existing applications without the risk of developers implementing the changes differently. This can be done automatically, such that as soon as an application picks up a new version of the pattern, all of the screens that use that pattern will automatically be updated in line with the new version.

In some examples parts of the realization of a particular pattern may be derived not only from the supplied pattern usage document, but also from the business services being used to provide data for the realized pattern. Examples of this might be when a new attribute is added to a service interface or data collection, the realized pattern could automatically display this new attribute with no intervention on the part of the pattern designer or consumer. Additionally, in some cases, should the business service(s) in use provide additional metadata describing the service, it's attributes and operations then the pattern may be able to automatically respond to changes in that metadata unless the pattern consumer has chosen to override that inheritance behavior. Examples of such metadata would be User Interface Hints such as display labels and data types as well as more complex information such as validation rules.

A single pattern definition can be used to provide A-B testing capabilities within the UI without additional work from the developer using the pattern.

In some examples, the features described herein enable A-B testing in the wild (e.g., at runtime, while users are actually using the applications). For example, multiple different versions of a UI may be generated and/or changed on the fly, and a development or user experience team can present the different versions to different relevant user populations to see the results of using the different versions. This can be used for the evolution of a particular patterns development and/or to determine what patterns are more effective than others for enabling particular tasks. Different versions can be presented to different user populations, and see which is more successful.

Customer customization can also be enabled by allowing users to customize in a safe way (e.g., without changing the standard). Certain changes (e.g., editing labels, rearranging fields, adding business logic to certain steps, or adding new screens or business objects, etc.) will be permitted. When a development team has configured a pattern-based screen, the downstream customer who is using the application on the cloud, will be able to customize that pattern configuration in a non-disruptive way. For example, if the customer wants to hide data elements, or change label, etc., the customer administrator can just change the pattern definition document to indicate the desired reconfiguration and that change is stored as a non-destructive customization to the pattern inside of a metadata repository, and that will allow the system to reapply any of those customizations to new versions as they are rolled out. In some examples, the customization is non-destructive because the customization itself will not be destroyed by a product or pattern revision, but also because the customization does not destroy the pattern implementation. For example, customization can be implemented as filters on top of the pattern implementation without the developer realizing that they did not change the underlining implementation. That way, when a new version comes out, the filter can still be reapplied so that the customizations that the developer wanted still exist. Customizations can be prototyped with live data in a safe sandboxed environment which may be accessible by a single or restricted set of users and testers before publishing to the wider user community.

In some examples, customers may add new screens, and they can use the high-level pattern definition language to describe such new screens. Thus, the system can guarantee that the new screens they build will always be visually and functionally compatible with the existing screens of the system. This is because the new screens and the existing screens will all be using the same pattern engine for creation, removing variance from the system especially when a customer adds some custom UI into the middle of a standard UI. Using the pattern approach, the developer is not actually making explicit statements about how their screen should look. Instead, they just describe what they want in terms of the pattern. Then, the system can guarantee that the UI will look exactly the same and operate exactly the same as the standard. This is because the same pattern engine is being used to generate the UI.

A pattern definition encompasses all of the resources required to define the pattern instance, this includes not only the physical UI implementation, but also bindings to whatever data source(s) are required to drive the page and resources in the form of translatable strings, icons and so forth.

A conventional templating approach, is generally quite a cumbersome process. For example, lots of different technologies (e.g., UI templating, reusable strings from a different source, icons, data binding to data sources) and each of these need to be performed as separate actions. And, traditional technologies like screen templating may only deal with one small part of that (e.g., the UI), but it wouldn't know how to deal with attaching to a data source in a generic fashion. Thus, the pattern definition consolidates everything that a developer would need into one single description of a pattern. This configuration tells the pattern engine everything that is needed to make the screen work (e.g., the UI aspect (which columns to display, etc.), the data binding, navigation, event handling and other underlining functionality). Additional things like getting translatable strings and/or icons are handled by the general pattern description that the user makes or by the plug-in module overrides which may enable additional standards to be applied to all pattern usages. So, the system works out (e.g., behind the scenes) what that actually means. In some examples, if a developer wants to add a button onto the screen, and they want that button to have an icon that represents the save action, the system will need to define an action, define an icon, and label it with the word "save." Then, the framework translates that icon description and working out what that means within the context of the pattern. It will determine an image file to use, where the image is from, make sure that the icon fits into the screen, etc. Finally, it will implement the correct API calls to actually carry out the required operations. The screen developer works at a high level of abstraction, and the framework (system) resolves their abstract description into a concrete implementation based at least in part on the platform that the pattern happens to be running on.

Patterns implemented in this manner of compact and more lightweight than the equivalent implementation in the existing JavaEE technology in terms of the number of lines of code that are required to implement a given instance of a pattern.

This technique layers on a complete, technology agnostic, eventing, navigation and messaging infrastructure which has the dual purpose of allowing the pattern definitions to function in a cross platform manner and also simplifies the pattern consumers task of interacting with and handling events from the pattern and the integration of that pattern into more manually created UIs.

The approach to pattern definition and implementation affords much more flexibility for the pattern consumers to configure the pattern to their exact requirements whilst still be constrained within the standards set by the pattern. Existing template or component technologies can only allow a certain amount of flexibility before they become too complex to define and use.

Within our products this invention provides the following direct business value:

Helping to enforce consistency across our Fusion Applications product line.

Vastly simplifying and speeding up the process of producing "standard" UIs that conform to defined patterns.

Can be mixed in with our existing UI definitions in a gradual and evolutionary manner.

Reduces the lines of code that the developer has to define by up to 90% for any given pattern implementation.

In some instances, it takes a lot of code to create a design pattern (e.g., in document form). The more code that exists for a given product, the more chance for errors exist for that code. Additionally, as described, when a developer utilizes the patterns described herein, they are essentially configuring the pattern for their application and/or features as opposed to writing "if-then-else" statements. As such, a certain amount of metadata will be generated for each application. However, the amount of data that the developer must write to build a screen is vastly reduced using this system. In some examples, the number of lines of code that a developer would need to check into their source control should be reduced by roughly 90% by use of this system. This leads to a reduced number of bugs, and where there are bugs, they are generally going to be in the pattern framework rather than in the developers implementation of the pattern. This means they can be fixed once, and all patterns using the common code can benefit from the single fix.

The implementation of the pattern has been centralized so there is one canonical version of how the pattern's functions are performed providing the most optimized possible version of the pattern to all downstream consumers.

Reduces the potential for bugs in the final implementation.

Allows low-effort portability to new platforms in the future.

Provides out of the box support for multiple form factors and A-B testing.

Provides the ability to customize the pattern configuration post application deployment by customers of the application in a constrained (cloud) environment.

This is a general approach to address the problem of creating standard pattern-based user interfaces and the core design could (and will) be implemented across multiple platforms and languages. As such, it can apply to any UI development paradigm.

In some examples, the current disclosure provides a way for teams to quickly implement something based at least in part on particular pattern definitions without having to reinvent the wheel each time. For example, if two teams are looking at the same design document, they may both develop a page with the same end result; however, the underlying implementation may be slightly different. For example, the two teams may use different techniques to introduce the same space within a set of pixels. This can lead to wasted effort and if the canonical description of the pattern is found to need change (e.g., as a result of user feedback and/or user experience work), it becomes very difficult to have the new standard met by each individual team currently implementing a version using that design pattern. In some examples, because each application was developed by a different team, each team would have to re-develop the code or declarations to implement the new standard. Unfortunately, the current template-based and/or component-based technologies can only help so far towards helping make these changes.

In this technique, the service provider can provide standardized implementations of the user interface patterns that downstream developers simply configure to their requirements. This is as opposed to solely providing the developers with descriptive documentation (e.g., written documents that explain how things should look). Essentially, this is a higher level of abstraction on top of the existing model. In this way, the developers can configure the pattern, and the pattern can manage the implementation of the UI on the platform that is desired to be targeted. Conceptually, it is a bit like a template-based solution, and it can use templates as part of the implementation. However, the solution is different from, and an improvement on, templates because the patterns are a runtime abstraction, not just a design time tool. Instead of stamping out a UI, and leaving the developer to deal with the result, the pattern enables the developers to interact with APIs to implement the pattern. The solution does more than just deal with the UIs, it also includes an eventing model, a navigation model and a data service integration layer that takes care of details of data access for the pattern.

Decoupling UI definition from underlying technology delivers a UX which is Contemporary, Standard, Easy to Uptake, Extensible, and Upgradeable. In some examples, the following steps may be performed to implement the framework described herein:

Step 1 is described with reference to FIG. 1, where a library of high-level UI pattern descriptions can be created. In some examples, the library can be created by a user experience team. The selection of patterns can be aligned with business use cases. Additionally, the look and feel, event model, and interactions can be described by the descriptions. The example shown in FIG. 1 illustrates one possible embodiment of such a design, illustrating a multi-page pattern where the user is invited to search for and then select a particular data record (for example a customer order) and then transition to a second page in order to edit that record. Additional features and embodiments will be described in further detail with reference to FIGS. 2-9 below.

Figure 2:
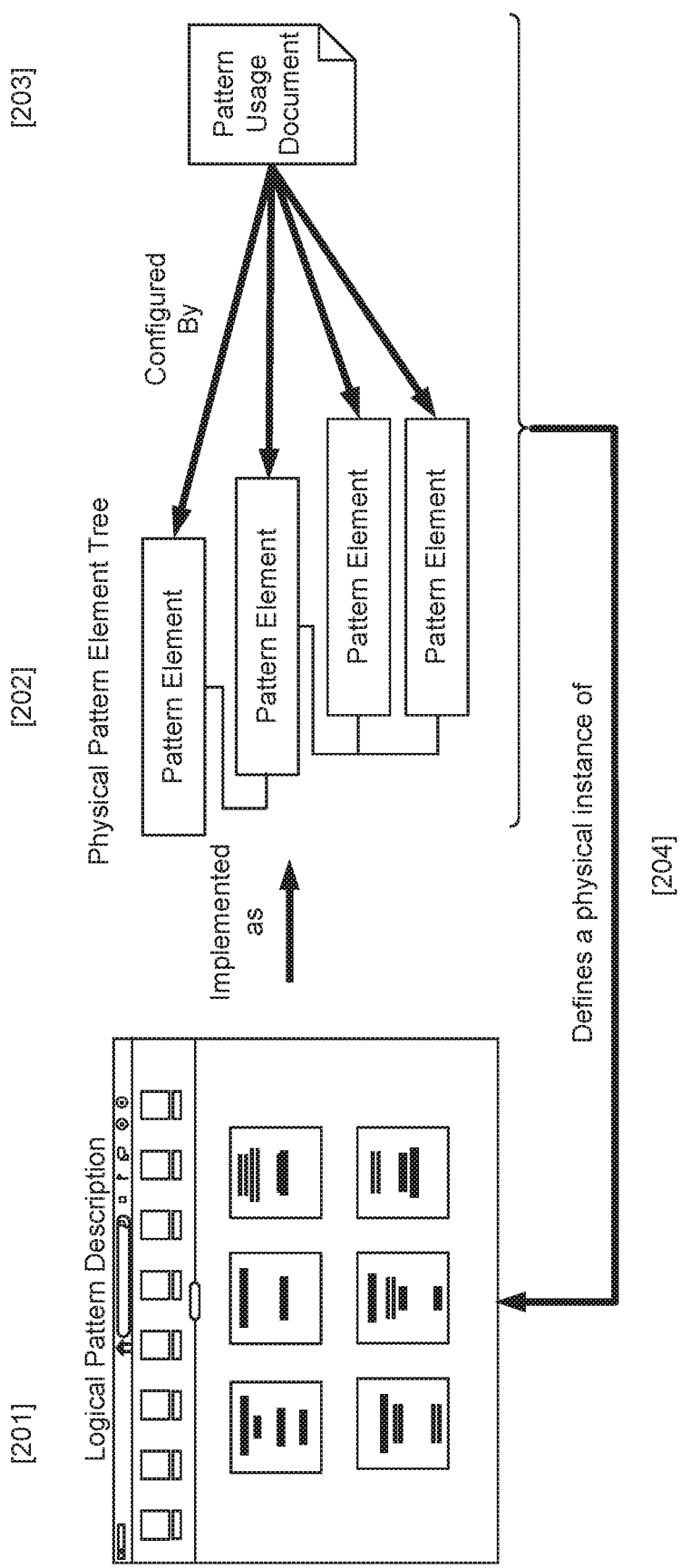
FIG. 2 is another simplified block diagram illustrating components of the multi-platform pattern-based user interface, in accordance with an embodiment of the present disclosure.

Step 2 is described with reference to FIG. 2, where the functional description can be decoupled from the UI representation:

In some examples, 201 is a logical paper description of a particular pattern from step 1 of FIG. 1 above. Looking at the physical pattern element tree 202, each pattern can be represented as a hierarchy of Pattern Elements that describe and the layout and UX behavior. A simple pattern may be represented by a single element or a more complex tree of multiple elements. This tree structure allows re-use of common sub-patterns. In some cases, the Pattern Usage Document 203 is the high-level metadata file that describes the data binding, navigation, resources, actions and configures each of the Pattern Elements that compose the implementation. At step 204, the desired final UI is generated by combining the output from the Pattern Element tree 202 which has been configured with the metadata from the Pattern Usage Document 203.

Figure 3:
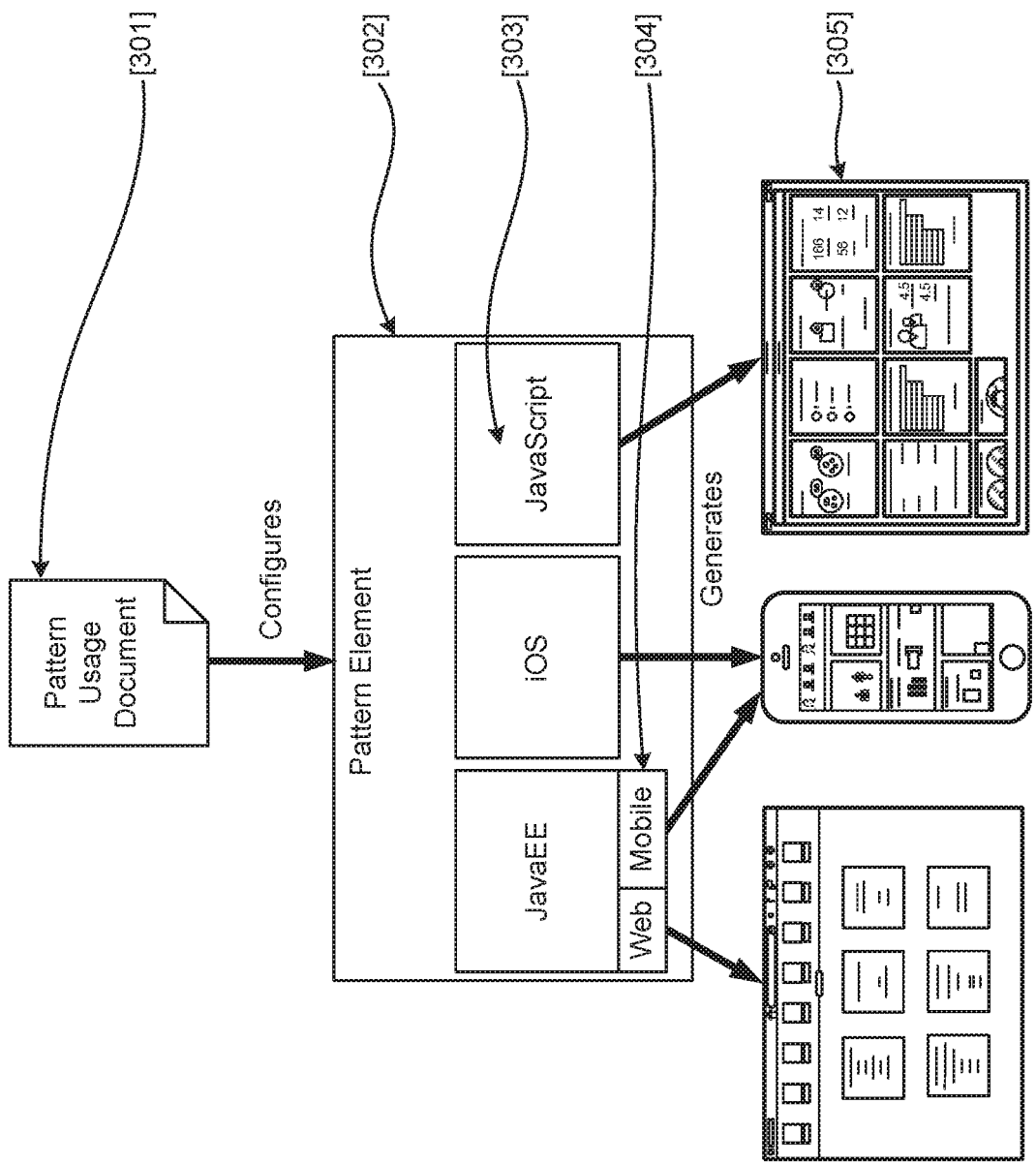
FIG. 3 is another simplified block diagram illustrating additional components of the multi-platform pattern-based user interface, in accordance with an embodiment of the present disclosure.

Step 3 is described with reference to FIG. 3. This figure covers other platforms and future UI technologies. In some examples a generic pattern usage document 301 can configure a pattern element within the pattern hierarchy in a generic, technology agnostic manner. The Pattern Element 302 provides a generic, technology agnostic configuration API which interfaces with the Pattern Usage document metadata providing technology agnostic descriptions of the available UI configuration, events and so forth. Each individual Pattern Element may provide internal support for multiple platforms (e.g., JavaEE, iOS, or JavaScript 303) through a pluggable adaptor mechanism. Each internal adaptor is capable of taking the technology agnostic configuration information defined for the Pattern Element 303 and transforming that into a physical implementation suitable for a specified technology platform. This includes both the realization of the UI and the interfacing between the internal pattern resource, navigation and eventing models. Additionally, a particular Pattern Element may support multiple targets or form-factors (e.g., Web or Mobile 304) within a particular technology stack. This allows the generation of patterns in a way that that it can provide multiple variants optimized for particular form factors (for example mobile phone screen). Output of the generation process 305 may be provided. This generation may be in-line "just-in-time" resolution of the UI, or it may be asynchronous and offline to allow caching of the resulting UI for reuse across sessions. The generated output is specific to the instance of a pattern as configured by the Pattern Usage document.

Figure 4:
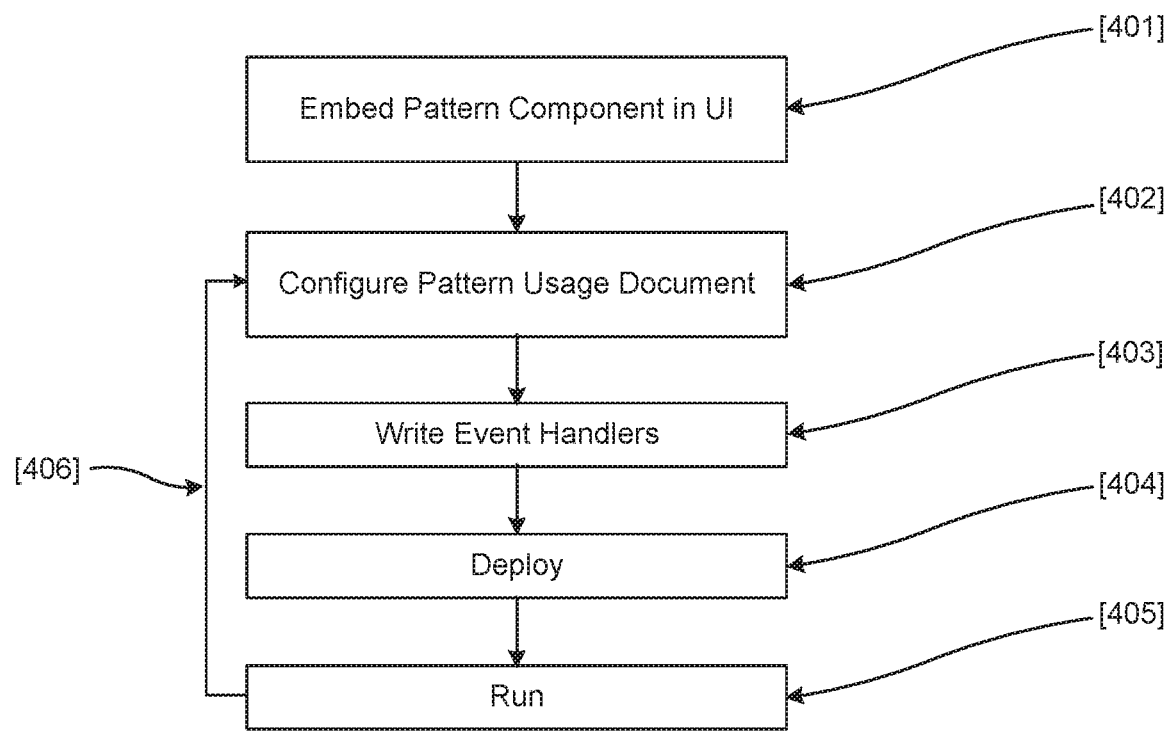
FIG. 4 is a simplified flow diagram illustrating an example flow for implementing the multi-platform pattern-based user interface, in accordance with an embodiment of the present disclosure.

Step 4 is described with reference to FIG. 4 and describes the pattern consumers' design experience. In some examples, the pattern consumer embeds a suitable carrier component in the target user interface at 401. In the Java EE (JSF) example, this carrier component is a single JSF component that represents the entire pattern. Surfacing the pattern integration as a standard component in this way allows seamless integration into existing user interfaces. In other implementations an appropriate native component model is used to achieve the same result, for example, in a JavaScript based UI, a custom HTML component would be used. At runtime, this component will be replaced by the defined pattern. In some examples, the generic UI integration component mentioned in the previous step is generic and must be configured, at 402, with a Pattern Usage document which is used to define the actual details of the pattern that is required. In some implementations, this document is defined in XML, although alternatives such as JSON or even binary formats are just as applicable. The purpose of this document definition is to declare all of the services, resources and navigations required by the pattern instance and to configure the individual elements that define the required pattern output. In some implementations, for example, when using an advanced IDE such as Oracle JDeveloper, this step may be combined with step 401 as the pattern consumer will be able to drag and drop a representation of the business service into an existing UI screen design. Upon drop, the IDE can create both the carrier component 401 and configure an initial Pattern Usage document based on the required pattern which is pre-wired to the dragged service and pre-configured with standard resource bundles and so forth. In any case, the pattern consumer now carries out further configuration within the Pattern Usage document to tune the pattern within its required limits to the use case in hand.

Having configured the essentials of the pattern instance in the Pattern Usage document, the pattern consumer now has the opportunity to define the event handlers for the pattern at 403. As part of its abstraction, the pattern instance being created defines high-level business events for the pattern consumer to listen to and react on. Therefore, the pattern consumer is insulated from the low-level interaction events (e.g. mouse click, key-down, touch etc.) generated by the target UI platform and instead works at a higher level relating to the functionality of the chosen pattern. For example, a pattern may expose a logical "Save" activity and make "pre-save" and "post-save" events available to the pattern consumer to write handlers for. The pattern consumer does not have to be concerned as to which user actions within the pattern give rise to these events. Event handlers can be written in a variety of languages as per the requirements of the deployment platform. At runtime, the pattern framework may choose to transport the handlers for these events to an alternative particular layer in the execution stack. For example, a pattern consumers event handler written in JavaScript may be executed in the Java EE server layer, or it may be automatically transported to execute on the browser client. This process is transparent to the pattern consumer.

Once the initial configuration of the pattern is complete, the application can be deployed at 404. In some cases, the act of deployment may cause a pre-compilation of the pattern. In this process, the Pattern Usage document is interpreted and used to generate a cached version of the actual pattern implementation for that instance. This pre-caching of the generated pattern may, in some cases improve performance during the use of pattern bearing UIs. In other cases, and platforms, the pattern resolution may be carried out in a just-in-time manner as the UI is presented to the end user. This distinction is again transparent to both the pattern consumer and the application end user. The resulting UI is then available for execution at 405. If a change is required in the pattern (for example, relocating fields, changing labels or other reconfiguration), the pattern developer can go back to the Pattern Usage document of 402 which is regarded as the source of truth, make the changes and re-deploy.

Figure 5:
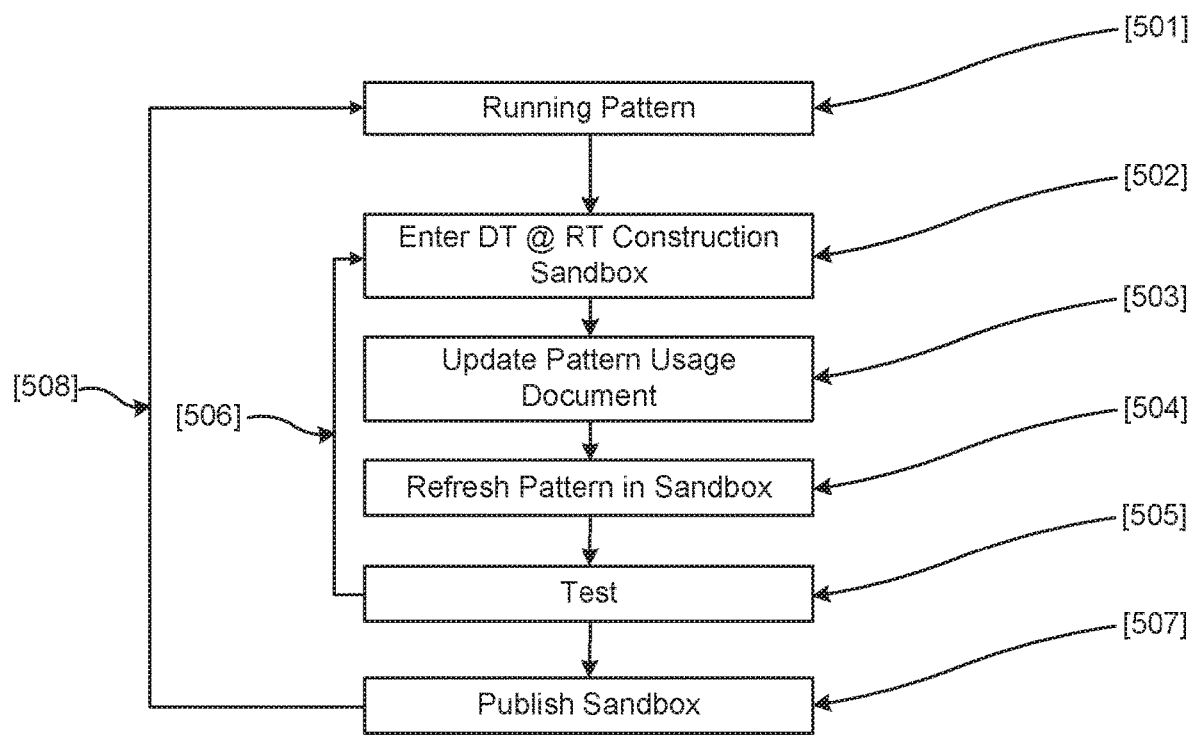
FIG. 5 is another simplified flow diagram illustrating an example flow for implementing the multi-platform pattern-based user interface, in accordance with an embodiment of the present disclosure.

Step 5 is described with respect to FIG. 5, which illustrates changing patterns in a Deployed Application. Once an application is deployed, for example into a cloud infrastructure, any patterns contained within the running application may be a candidate for further customization by a suitably privileged user administrator at 501. This will allow a customer of a cloud deployed application to tailor the application screens to their exact needs and provides an interface to enhance and extend the basic application to further suit the needs of their business. In order to start the runtime customization process (also called Design Time at Runtime or, DT@RT) at 502. A suitably privileged user establishes a customization sandbox. This sandbox affords the user the opportunity to make changes to the pattern implementation in a safe way that can be shared with selected other users if necessary. Any changes made within the sandbox will not impact the general user population and if necessary can be discarded without impact. It is possible for multiple sandboxes to be in operation at any one time to allow multiple parallel change processes to be conducted and later merged. Sandboxes can persist for as long as is required to carry out the specified changes.

Once in the sandboxed environment, the suitably privileged user is able to reconfigure or extend the pattern by making changes to the pattern usage document at 503. The schemas associated with the Pattern Usage document and the pattern element plugins being used will prevent the user from inadvertently making a fatal mistake in the definition of the pattern. Depending on the platform in use, sophisticated tooling can be supplied to aid the user in the reconfiguration of the pattern. Such tooling might, for example, consist of a web-browser based IDE style of interface which provides an easy to use, drag and drop environment, where the user is shielded from direct manipulation of the Pattern Usage document. Part of the API definition of each re-usable Pattern Element is to provide the additional metadata that such a development environment needs in order to present the user with the correct options and capabilities for customizations.

The sandbox is also available for making changes to non-pattern metadata as well. As such, the user may make a coordinated set of changes to, for example, the business model, as well as the page UI used to display it. At 504, once the privileged user has manipulated the pattern definition within the sandboxed environment and development tools, the pattern is realized (re-generated) within that sandboxed environment. At 505, the user doing the customization can now immediately test, and operate on, the results of the DT@RT customization without having to formally publish the changes to all users. At 506, the process of customization (e.g., 502 through 505) can be iterative. The user can go through as many edit and testing cycles as are desired to perfect changes within the context of the sandbox. At 507, once the user is done with the changes made within the sandboxed environment, they can publish the revised version of the pattern to the general population. At 508, when a revised pattern is published for general use, it is created as a new version of the pattern which will be picked up by any new session that accesses the relevant UI. Internally, each new version created in this way is stored as a "diff" or filter to the original base Pattern Usage document created by the developers of the user interface. If the core application is upgraded, this "diff" can be seamlessly re-applied to the new version of the pattern. (See FIG. 6). If necessary a suitably privileged user administrator could revert the pattern usage document to some earlier version in order to rollback a change without otherwise having to shutdown or reconfigure the running application.

Figure 6:
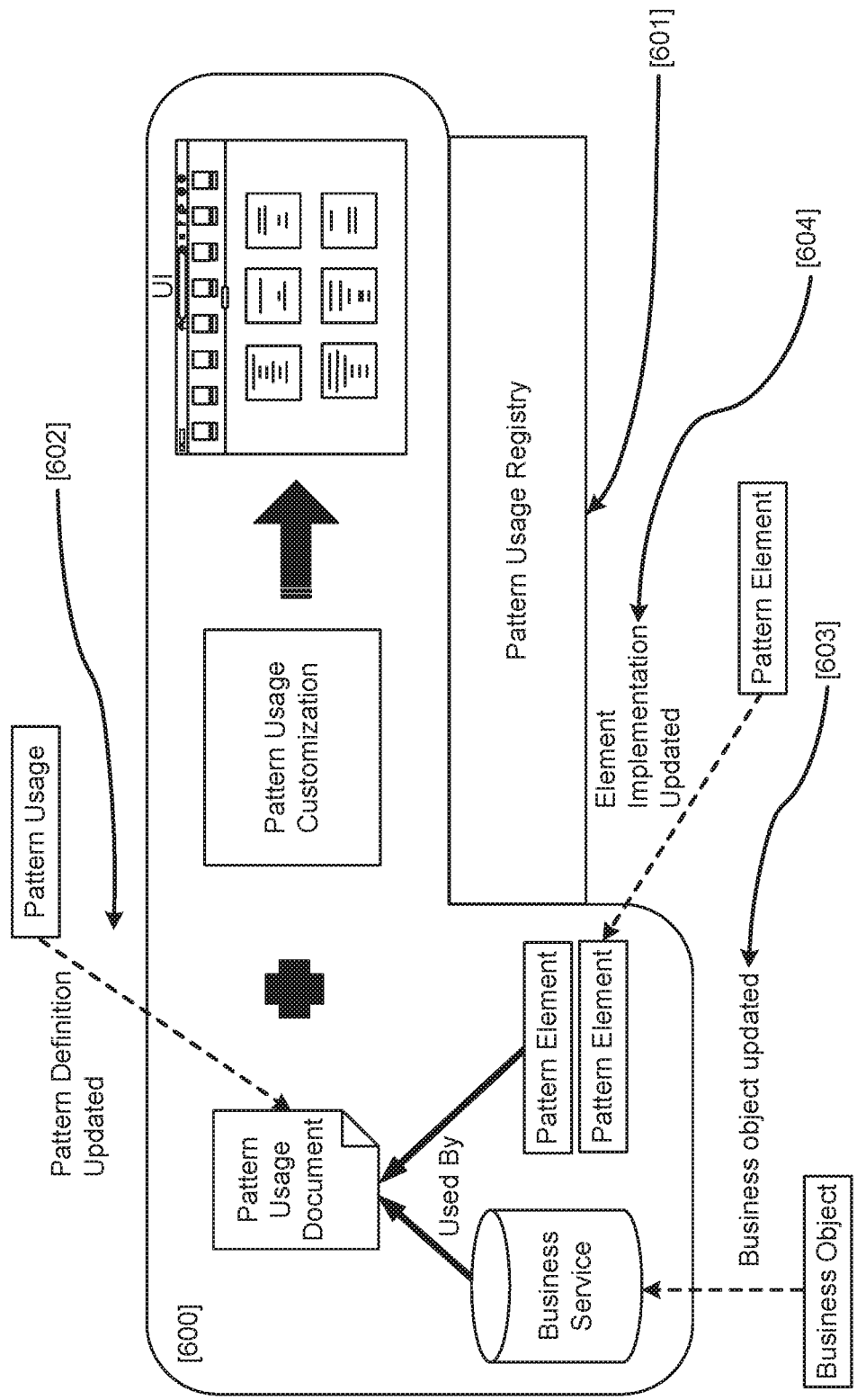
FIG. 6 is another simplified block diagram illustrating additional components of the multi-platform pattern-based user interface, in accordance with an embodiment of the present disclosure.

Step 6 is described with respect to FIG. 6, which illustrates external post deployment changes that can be made to a pattern. As described, a pattern 600 can depend on many resources including the basic definition of the pattern usage document developed by the Application Developer, the shape and operations of the business models and the implementation of each of the pattern elements that the final UI depends upon. This is all merged, including any DT@RT customizations to create the final UI implementation of the pattern that is presented to the end user of the application. In some examples, the pattern framework maintains a registry 601 internally, which cross references the dependencies between a particular UI, Pattern Usage document and external resources. If the development team issues an update to the base version of a Pattern Usage document for a particular UI the system will seamlessly merge this with any "diff"s (see Step 5) created by DT@RT changes at 602. This will cause the UI to be regenerated with the updated pattern implementation which is based on re-applying the DT@RT diffs to the new base document. Re-creation of the pattern UI will be automatic in this case. Another common change outside of the control of the pattern user might be to update to a business object used by the pattern at 603. This change might consist of a new attribute being added, or maybe a business rule change. In this case, the registry 601 will provide information about the dependencies between the pattern and the business object and the Pattern UI can be automatically regenerated should that be required. Over time, the desired look and behavior of a pattern may evolve. Such a change would be implemented by the release of a new version of a particular pattern element that represents that change at 604. Again the pattern usage registry already tracks which pattern usage documents have a dependency on the pattern element that is being changed. Accordingly, the pattern framework can automatically regenerate any of these dependencies, thus ensuring a complete rollout of the new version of this standardized UI pattern.

Figure 7:
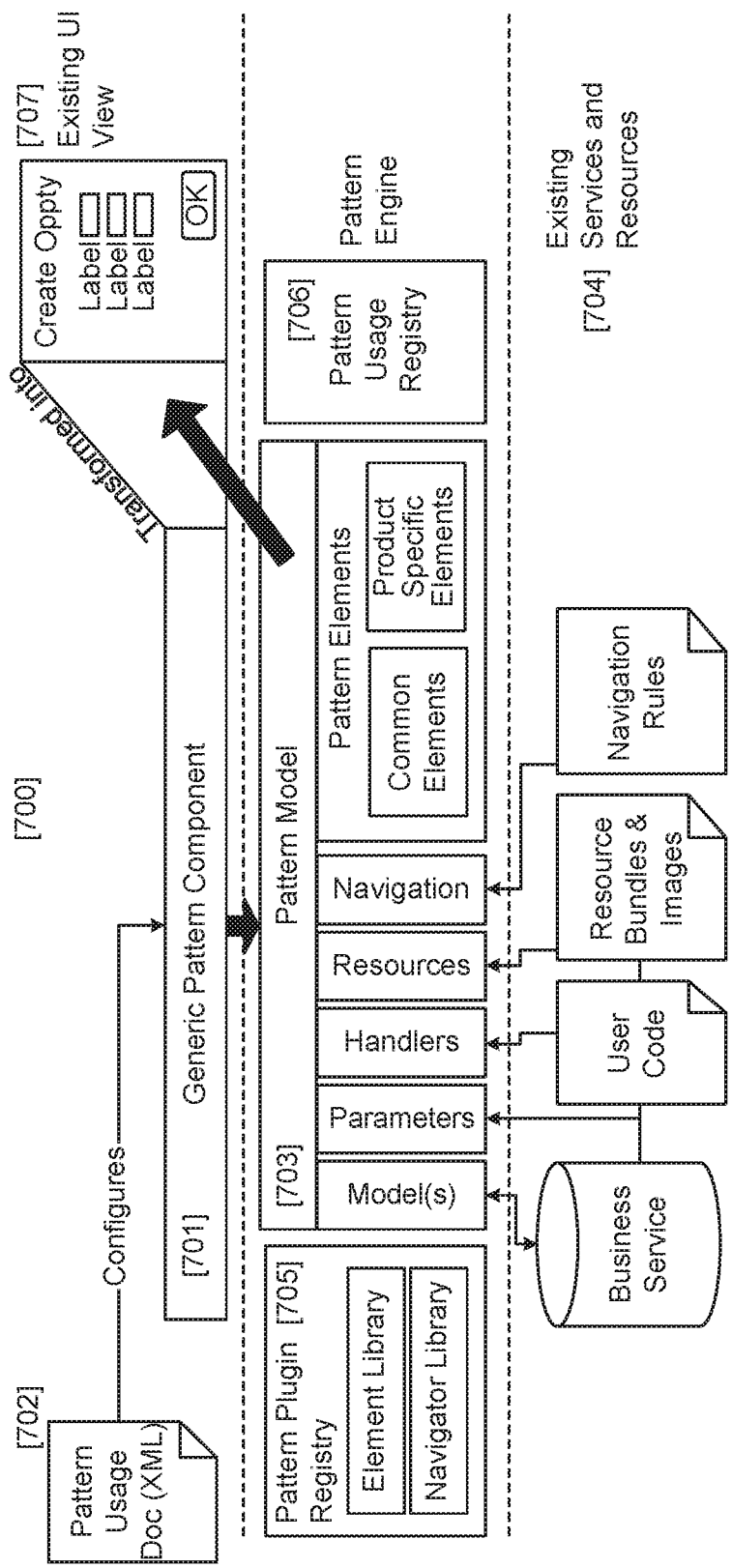
FIG. 7 is another simplified block diagram illustrating additional components of the multi-platform pattern-based user interface, in accordance with an embodiment of the present disclosure.

In some examples, the features and elements described herein can be illustrated with reference to the pattern architecture of FIG. 7, including the system 700 for implementing the UI. In some examples, a user adds the generic pattern carrier component 701 into their existing UI. This acts as a placeholder for the entire pattern once realized. The Pattern Usage document 702 is created and associated with the carrier component 701. This document represents a complete definition and configuration plan for this pattern instance. The Pattern Usage document is read and transformed into an in-memory representation of the pattern instance, called a pattern model 703. This in-memory model 703 fully describes all of the resources required to integrate into the pattern and configures the pattern elements that make up the structural definition of the pattern. In some instances, this instance specific representation of the pattern instance may be cached across multiple invocations and user sessions to improve performance and remove the cost of re-generating the pattern from its definition on every access.

Existing resources 704 in the form of business services, resource bundles, images and so forth can be referenced and integrated into the pattern in-memory model. While the pattern in-memory model 703 is being instantiated from the information encoded into the Pattern Usage document, the Pattern Plugin Registry 705 is consulted to provide the physical object that is required to make the definition concrete. The Pattern system 700 maintains a series of libraries which are populated from pluggable sets of functionality. This allows a common pattern core to be used with a wide range of specialist pattern elements that are created to meet the needs of a particular system. These libraries can be extended at design time or runtime as is required by the application being built. A standardized plugin model for adding to the libraries ensures that the pattern engine does not have to have fore-knowledge of every possible pattern that may be configured through the system.

When a pattern instance is instantiated, information about its dependencies in terms of elements and business services used are recorded into the Pattern Usage Registry 706. This registry 706 is used to perform impact analysis on the system. With this information available, the system 700 can automatically refresh any pattern instances which reference a changed resource or pattern design. As patterns are automatically refreshed, development teams can roll out new versions of a pattern design at very low cost and at high frequency.

The in-memory pattern model is transformed into a physical rendering within the application user interface. This resulting UI 707 is bound to the underlying in-memory model of the pattern which acts as a proxy for all events and manipulation of the UI. For example to change a label in the UI, code would call the relevant API on the in-memory model of the pattern rather than directly talking to the physical UI component.

Figure 8:
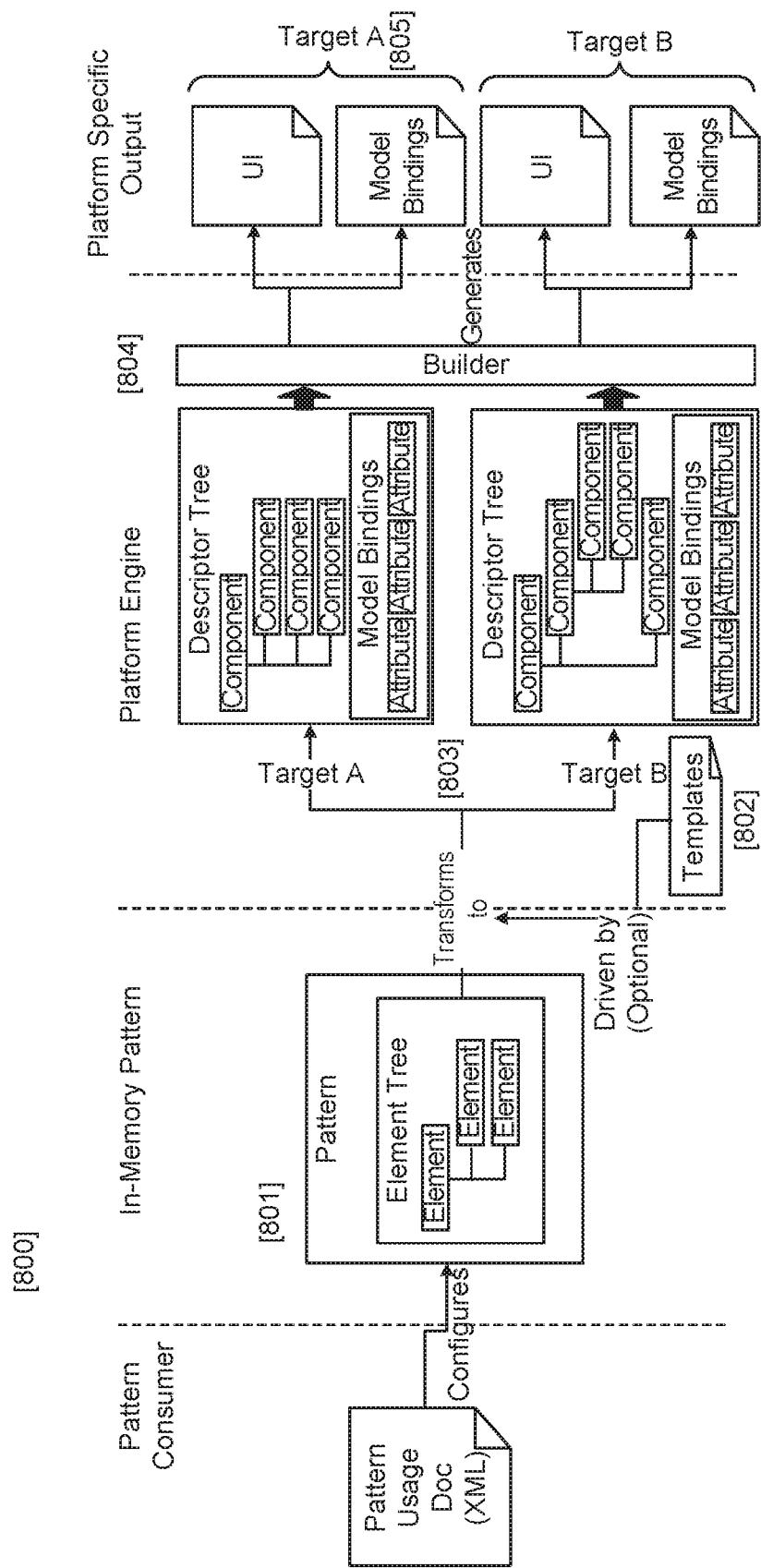
FIG. 8 is another simplified block diagram illustrating additional components of the multi-platform pattern-based user interface, in accordance with an embodiment of the present disclosure.

FIG. 8 illustrates, in some examples, how a pattern is transformed to a UI. In some examples, the flow 800 illustrates the process that occurs in step 707 of the previous figure. At 801, the in-memory model of the pattern has been constructed based on the information provided by the pattern usage document referencing the available plug-in elements defined in the pattern resource library and other defined resources such as business models. As part of the process of transforming this model into a real-UI implementation the plug-in elements normally supply all of the capability. However, there is also the opportunity to inject additional templates 802 to override certain parts of the generation process. At 803, the process of generation to a real UI from the in-memory model will involve at least one target form factor (e.g. a desktop web browser). It is possible, however, for multiple targets to be catered for as part of a single generation process, allowing multiple UI variants to be created concurrently, for example to support web browsers on a mobile device as well as the desktop, from the same definition. The initial stage of this process is to transform the generic in-memory model into an intermediate platform specific descriptor tree. This descriptor tree is an expanded version of the in-memory model, where the generic Pattern Elements used by the base model are realized as a set of descriptions of UI components and model bindings that are specific to a particular platform. Each Pattern Element may support adaptors to carry out this transformation from the generic description for multiple target platforms.

At 804, these platform specific descriptor trees are transformed by a generic builder into the physical artefacts required for the UI to function. This will not only include the actual UI fragment itself but will also include the injection of bindings to any resource that the UI requires including business services, resource strings and images. At 805, the final results of the builder action might be multiple artefacts, depending on the platform and frameworks being used. In many cases there will be the generation of both user interface metadata and executable code.

Figure 9:
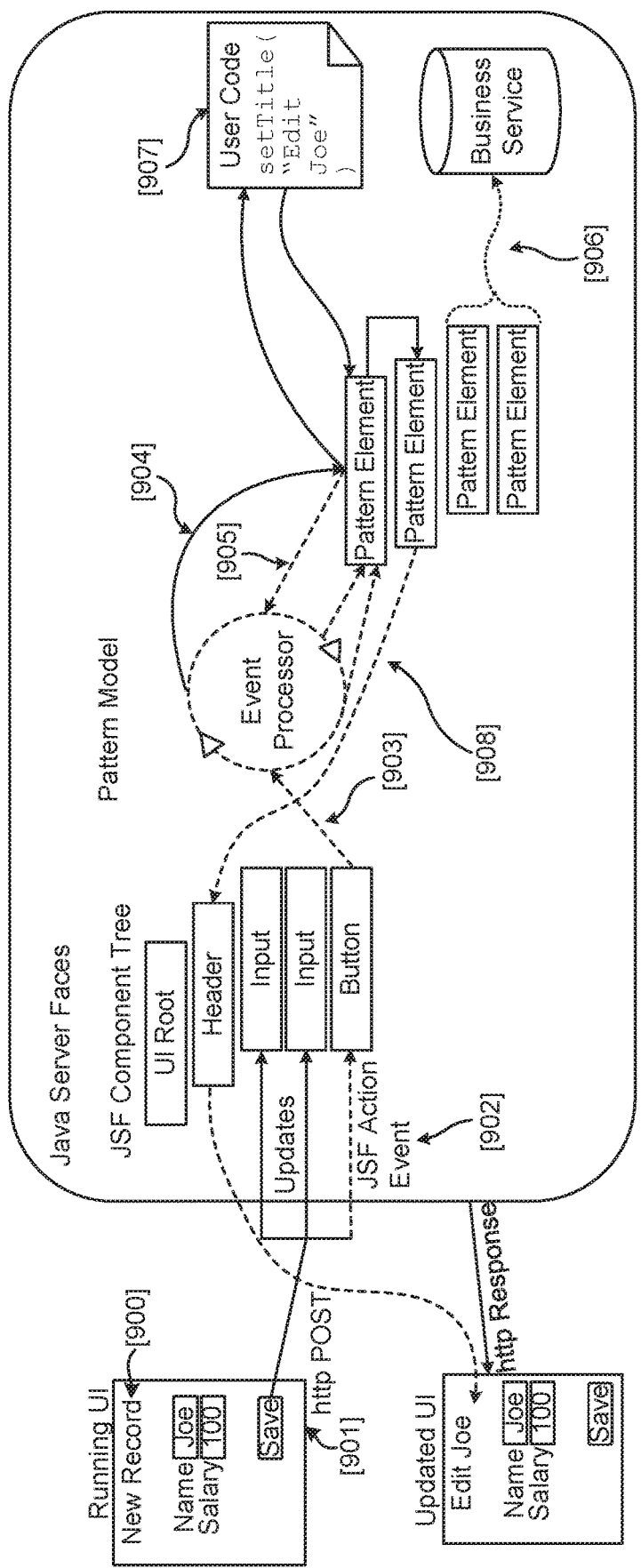
FIG. 9 is another simplified block diagram illustrating additional components of the multi-platform pattern-based user interface, in accordance with an embodiment of the present disclosure.

FIG. 9 illustrates and example UI event handling process. This figure illustrates the event abstraction provided by the pattern using an illustration based on a JavaEE (JSF) based implementation. In this example, the pattern will be allowed to carry out its default behavior of saving a new record 900 to the business service, but the pattern consumer has a requirement to update the title on the UI to reflect the change. In interacting with a input-form style pattern, the user of the application fills in some fields in the record-creation UI and clicks the "Save" button 901 generated into the UI by the defining pattern. Given that this is a JSF based example, this will send an HTTP POST from the browser to the JavaEE server JSF engine. Here the POST request will be interpreted and unwound into the updates required to the JSF input components and a JSF "action" event 902 associated with the server side button component that produced the HTML button element in the UI.

At 903, the pattern framework provides an adaptor layer that transforms this JSF specific action event into a generic pattern "save" event which is submitted into the pattern framework internal event processor. At 904, the pattern "save" event is forwarded by the event processor to the correct pattern element. Upon receiving this externally triggered event, the handling pattern element can handle it directly, or, as in this case, it can choose to decompose the event into a set of further events at 905. In this example, the external event is decomposed into two different events, one to invoke the internal save "saveInternal" functionality of the pattern and a "postSave" event which is available for the pattern consumer to subscribe to and provide an external handler for. Both the "saveInternal" and "postSave" events are bound together using a unique transaction identifier that identifies their origin as part of the same logical transaction.

At 906, the "saveInternal" event is passed to the correct pattern element, which working though it's business service adapter, will carry out the correct set of operations to write the new record to the business service layer. Should this step fail then the associated event ("postSave") will be automatically be removed from the event queue based in the transaction identifier mentioned in 905.

At 906, the user handler for the "postSave" event has been registered by the pattern consumer in the Pattern Usage document. Assuming that the previous events in the event chain have succeeded, the pattern framework will invoke the registered handler using a standardized API and execute the user code. In some cases, this user code may be relocated between logical platform layers in the process of this. For example a handler written in JavaScript as a language may be run either in the JavaEE server or may be shipped down to the browser for execution. Pattern users create such event handlers to a standard API and interact with the pattern using a platform agnostic set of APIs without any regard for the physical implementation of the pattern. In this example the user code calls a setTitle( ) API on the Pattern. Based on the platform in use, the pattern elements that control the pattern behavior will interpret this API call and translate that into the correct action for the display framework in question at 908. In this example, the pattern will update the correct JSF header component in the JSF component tree with the new label using it's platform specific APIs. This in turn will ensure that when the browser client side page re-renders, the new record has been saved to the business service and the title text has been appropriately updated as per the code provided by the user.

In some cases, FIG. 9 illustrates the following keys points:

- Platform specific events are translated into generic pattern events that represent high-level business interactions e.g. a low-level JSF action event becomes a business object logical save event. This provides a simpler API for the pattern consumer to understand
- Single platform events may be decomposed into a whole chain of logical business events which may be processed or cancelled as a unit.
- Many of the business events within the pattern will be handled automatically by the internal logic of the pattern implementation through its business service adaptor layer, ensuring that user code intervention is rarely needed. Some events generated by the pattern may be hidden from the pattern consumer in order to prevent them from interrupting the correct processing of the patterns in-build functionality
- When pattern consumers do decorate a business process with event handlers, these are written in a platform agnostic manner using pattern level APIs. Here the pattern consumer is shielded from having to understand the underlying implementation of the pattern in terms of the platform level components used to create it. This is vital as the physical implementation of the pattern may change over time and we want this to be possible without having to re-write event listeners General Advantages of such a Pattern Based System:

1. It's easy to use. Design time tooling can provide a simple drag and drop experience which will pre-wire the pattern to all the required resources and allow those to be further configured in a single compact definition document.
2. The amount of code create directly by the pattern consumer is generally ~90% less than a manual implementation of the same user interface and behaviors.
3. Pattern configuration works on the basis of convention over configuration. Sensible defaults and well defined behavior, ensure that the consumer of a pattern has to do as little configuration as possible to arrive at a working implementation.
4. Each pattern that is supported by the engine is focused on a very particular use case with clearly defined guidelines and a precise configuration boundaries. The consumer of the pattern is not able to "break" the pattern, either visually or in terms of behavior. This provides a highly consistent user experience across all instances of the same pattern
5. Patterns come ready to use with the core behaviors already wired up to the user interface. Pattern consumers do not have to write additional code to carry out the business function that is the core intent of that pattern. For example, a table-style pattern may come with a record delete button in its toolbar. This button will be pre-wired to work through the generic business service adaptor layer to do everything that is required to delete the record (this may include providing a visual confirmation prompt for the user).
6. Where a pattern consumer does need to decorate the behavior of a pattern with custom code, this is done in a controlled way, ensuring that such code cannot disrupt the core behaviors of the pattern.
7. Any custom code supplied by the pattern consumer to decorate the pattern is written in a platform agnostic way using only the APIs provided by the pattern in use. This ensures portability across multiple platforms and between versions of a particular pattern design.
8. Patterns implemented in this manner can be mixed in with existing UIs, allowing for multiple pattern instances on the same page if that is required. This allows both graduated migration from a non-pattern to pattern based UI and also the blending of pattern based UIs into highly specialized on-off screens that don't lend themselves to patternization.
9. Each pattern instance on the UI maintains its own logical internal state and UI representation, although internally the framework may optimize the memory organization of the pattern instances to share definitions and state if appropriate. This ensures optimal memory and resource use between instances of the same pattern in a specific UI or across multiple user sessions.
10. Data sharing between pattern instances may be accomplished through a shared business services layer or through eventing.
11. Events can be dispatched between pattern instances to afford functionality such as master-detail synchronization. Such events can also be utilized to communicate between pattern and non-pattern content in a UI.

Patterns Versus Templates:

In some examples, the main difference between a pattern and a template is the resource management aspect that the use of patterns enables. While templates are passive, and even if changes can be reflected as you update the template, they are different from patterns at least because the framework described herein (utilizing patterns) will secure the additional resources and perform the extra work needed to perform the requested functionality. In other words, it's not just dealing with the UI presentation, but it's also dealing with getting access to the right sources of data, providing an interface for updating the data irrespective of where it's coming from. Another difference is that, the framework works with a set of low-level elements that describe a component or part of a pattern (in terms of UI, events, and behaviors, etc.), and those elements are extremely flexible in that they don't always do the same thing. In some examples, a primitive element called "group," inside which you put some fields. If the "group" is used within a table-based pattern, it will express itself as a column. However, if you do the same thing in a form-based UI, it will render those fields in a different way. Thus, the elements of a pattern are sensitive to the context in which they are getting used. Any individual element does not need to know ahead of time all the different ways in which it can be expressed. Mechanisms exist with the pattern framework to allow elements to decorate or override the behaviors of their child elements. This again means that individual Pattern Elements do not have to be precognizant of all possible modes of their use.

Figure 10:
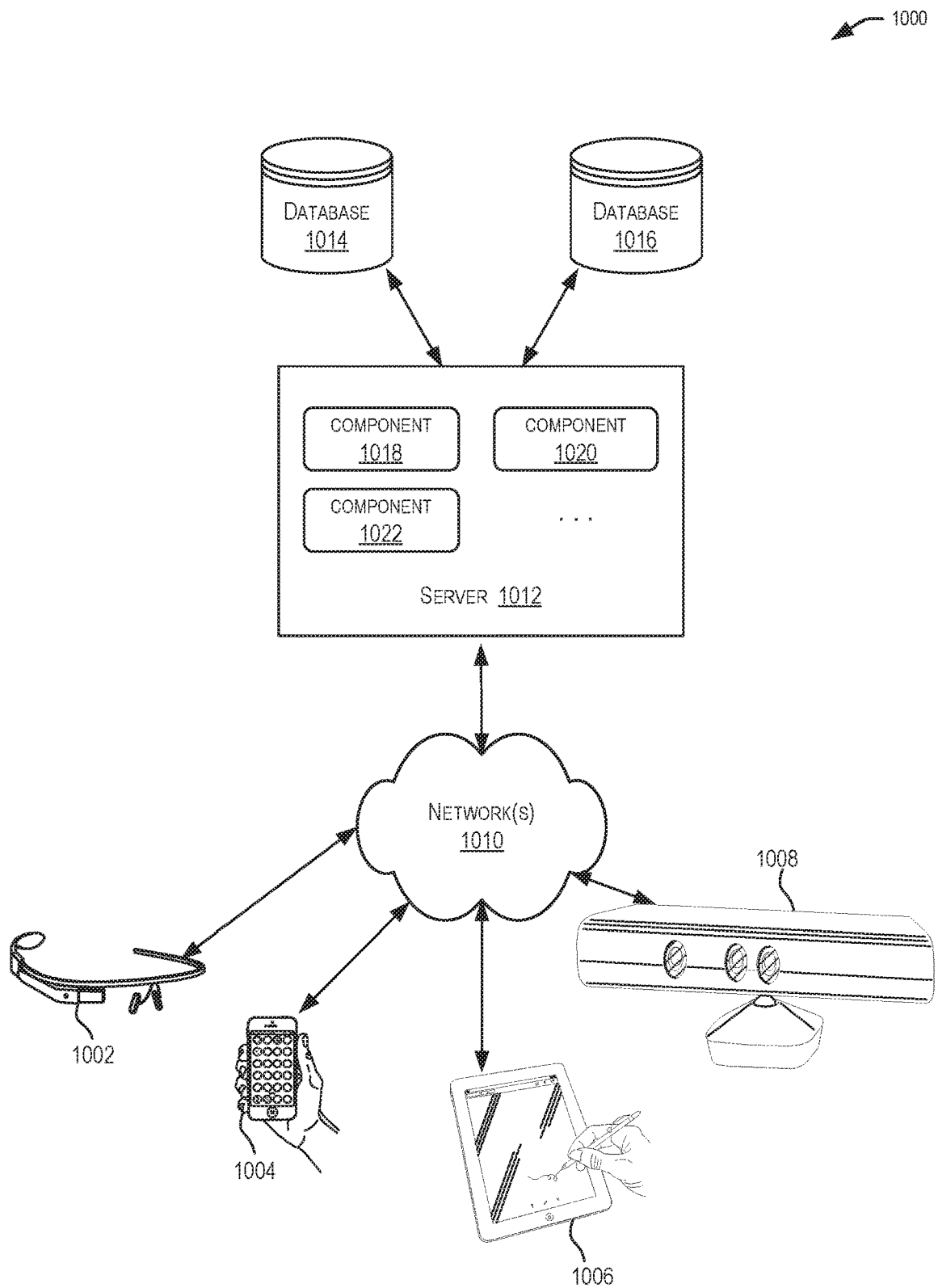
FIG. 10 depicts a simplified diagram of a distributed system for implementing one of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model to the users of client computing devices 1002, 1004, 1006, and/or 1008. Users operating client-computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general-purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
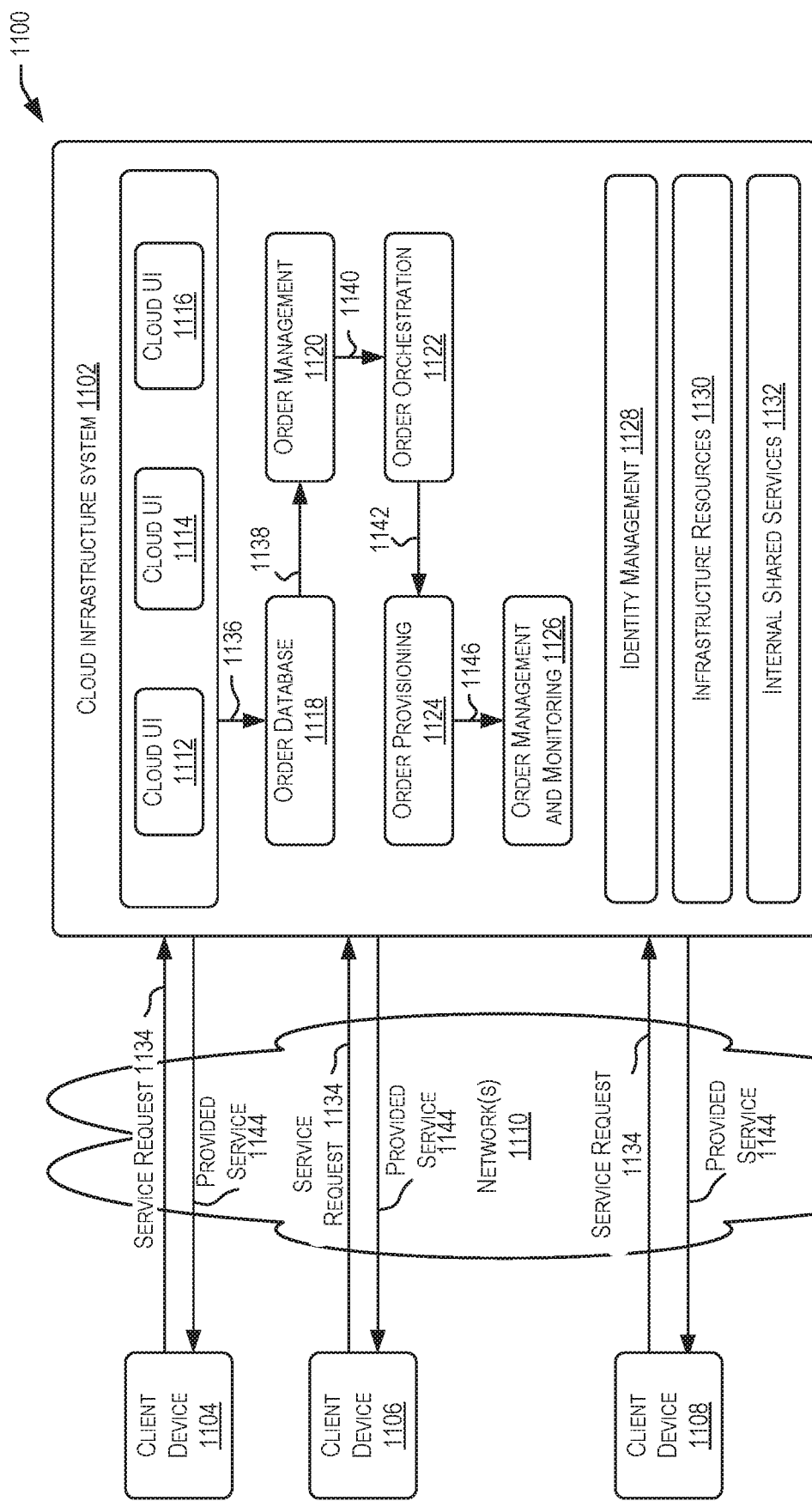
FIG. 11 is a simplified block diagram of one or more components of a system environment by which services provided by one or more components of an embodiment system may be offered as cloud services, in accordance with an embodiment of the present disclosure.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 602, 604, 606, and 608.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1610.

Cloud infrastructure system 1102 may comprise one or more computers and/or servers that may include those described above for server 1612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102. At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
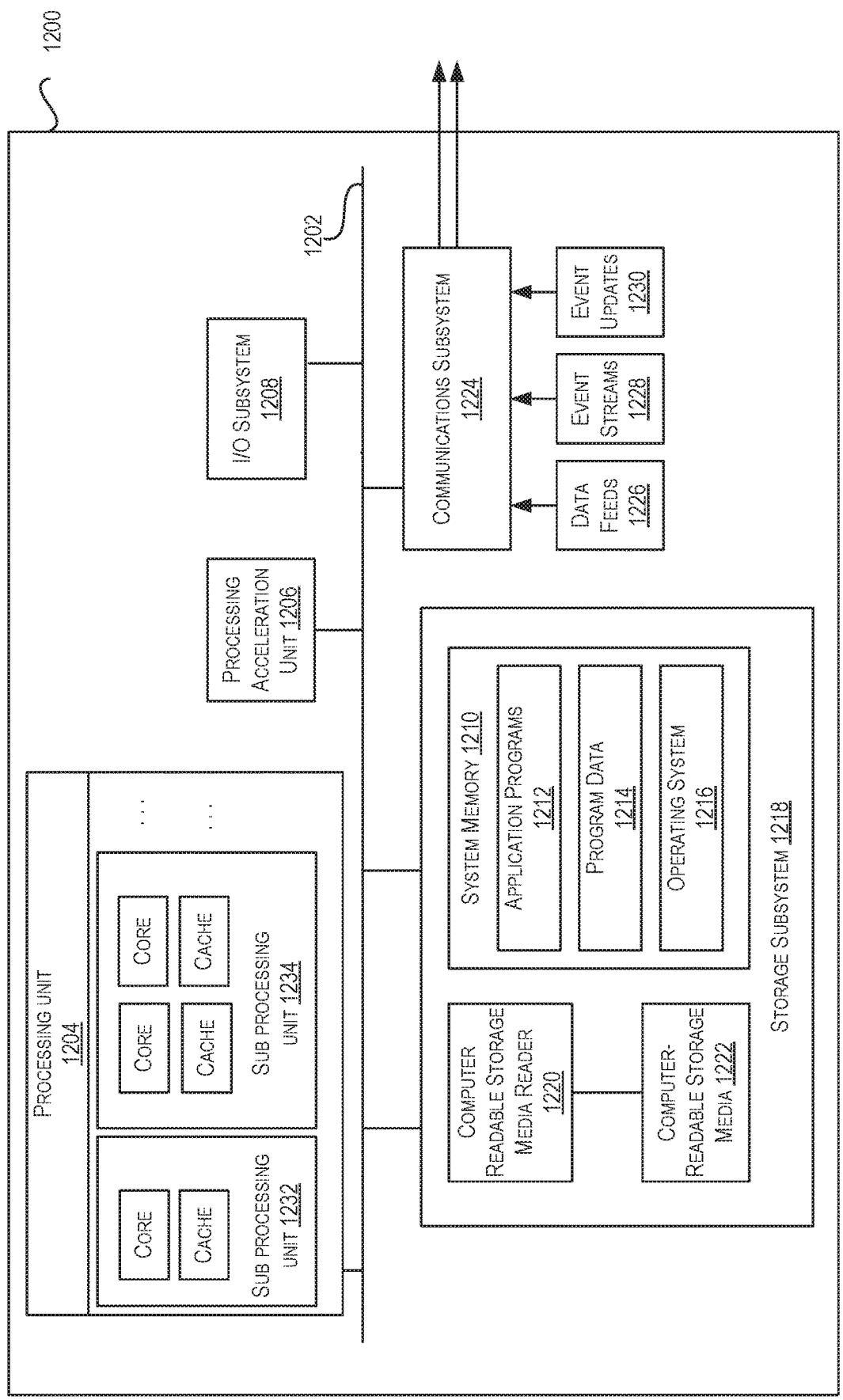
FIG. 12 illustrates an exemplary computer system, in which various embodiments of the present disclosure may be implemented.

FIG. 12 illustrates an exemplary computer system 1200, in which various embodiments of the present disclosure may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   determining a user experience design for a first user interface of a first platform of a plurality of different platforms, the user experience design comprising at least display attributes of the first user interface and behavioral elements of the first user interface;
   generating a pattern based at least in part on the user experience design, the pattern comprising a hierarchy of sub-elements for configuring specific aspects of the display attributes of the first user interface and behavioral elements of the first user interface, and the pattern being generated by implementing a generic builder to transform an in-memory pattern model corresponding to the user experience design into platform specific descriptor data for one or more particular platforms;
   receiving a request to design a second user interface for a second platform of the plurality of different platforms, the first platform being different from the second platform; and
   generating the second user interface for the second platform based at least in part on the generated pattern, the second user interface complying with the display attributes of the first user interface and behavioral elements of the first user interface.

2. The method of claim 1, wherein the user experience design further comprises a plurality of functional elements corresponding to the first user interface.

3. The method of claim 2, wherein the plurality of functional elements comprise user actions that can be performed via the first user interface.

4. The method of claim 3, wherein the pattern is configured as a carrier component that is embedded into the first user interfaces or the second user interface during a design phase.

5. The method of claim 4, further comprising replacing the carrier component with the pattern at runtime or at a second time, wherein the second time is based at least in part on a technology stack associated with the second user interface.

6. The method of claim 4, wherein the carrier component is configured by a pattern usage document.

7. The method of claim 3, further comprising enabling event handlers for the pattern to be defined by a consumer that provided the request to design the second user interface.

8. The method of claim 3, further comprising:
   deploying the second user interface; and
   generating a cached version of the pattern based at least in part on a pattern usage document that defines the pattern.

9. The method of claim 8, further comprising:
   receiving a request to update the pattern;
   providing the pattern usage document;
   receiving a revised pattern usage document; and
   redeploying the second user interface based at least in part on the revised pattern usage document.

10. The method of claim 9, wherein the pattern usage document is provided within a customization sandbox.

11. The method of claim 1, further comprising surfacing the second user interface in accordance with a particular adapter that corresponds to a type of an application that implements the second user interface.

12. The method of claim 1, wherein the pattern further comprises a pluggable adapter mechanism for configuring the specific aspects of the display attributes of the first user interface and behavioral elements of the first user interface for use in the second user interface of the second platform of the plurality of platforms.

13. The method of claim 1, wherein the pattern further comprises a standardized ranking mechanism for configuring specific aspects of the display attributes of the first user interface and behavioral elements of the first user interface.

14. The method of claim 1, wherein the platform specific descriptor data comprises one or more descriptor trees.

15. A system, comprising:
   a memory configured to store computer-executable instructions; and
   a processor configured to access the memory and execute the computer-executable instructions to at least:
   determine a user experience design for a first user interface of a first platform of a plurality of different platforms, the user experience design comprising at least display attributes of the first user interface and behavioral elements of the first user interface;

generate a pattern based at least in part on the user experience design, the pattern comprising a hierarchy of sub-elements for configuring specific aspects of the display attributes of the first user interface and behavioral elements of the first user interface, and the pattern being generated by implementing a generic builder to transform an in-memory pattern model corresponding to the user experience design into platform specific descriptor data for one or more particular platforms;

receive a request to design a second user interface for a second platform of the plurality of different platforms, the first platform being different from the second platform; and generate the second user interface for the second platform based at least in part on the generated pattern, the second user interface complying with the display attributes of the first user interface and the behavioral elements of the first user interface.

16. The system of claim 15, wherein the user experience design further comprises a plurality of functional elements corresponding to the first user interface.

17. A non-transitory computer-readable medium storing computer-executable code that, when executed by a processor, cause the processor to perform the operations comprising:

determining a user experience design for a first user interface of a first platform of a plurality of different platforms, the user experience design comprising at least display attributes of the first user interface and behavioral elements of the first user interface;

generating a pattern based at least in part on the user experience design, the pattern comprising a hierarchy of sub-elements for configuring specific aspects of the display attributes of the first user interface and the behavioral elements of the first user interface, and the pattern being generated by implementing a generic builder to transform an in-memory pattern model corresponding to the user experience design into platform specific descriptor data for one or more particular platforms;

receiving a request to design a second user interface for a second platform of the plurality of different platforms, the first platform being different from the second platform; and generating the second user interface for the second platform based at least in part on the generated pattern, the second user interface complying with the display attributes of the first user interface and the behavioral elements of the first user interface.

18. The non-transitory computer-readable medium of claim 17, wherein the user experience design further comprises a plurality of functional elements corresponding to the first user interface.

19. The non-transitory computer-readable medium of claim 18, wherein the plurality of functional elements comprise user actions configured to be performed via the first user interface.

20. The non-transitory computer-readable medium of claim 15, wherein the user actions comprise at least one of finding a record, duplicating a record, drilling down into a record, or rotating a device configured to display the first user interface.

* * * * *

UNITED STATES PATENT AND TRADEMARK OFFICE
CERTIFICATE OF CORRECTION

Page 1 of 1

PATENT NO.        : 11,157,270 B2
APPLICATION NO.   : 16/448580
DATED             : October 26, 2021
INVENTOR(S)       : Mills et al.

It is certified that error appears in the above-identified patent and that said Letters Patent is hereby corrected as shown below:

In the Specification

In Column 10, Line 22, delete "that that" and insert -- that --, therefor.

In the Claims

In Column 30, in Claim 20, Line 29, delete "claim 15" and insert -- claim 19 --, therefor.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*